United States Patent [19]

Walser

[11] Patent Number: 5,524,907
[45] Date of Patent: Jun. 11, 1996

[54] AUTOMOTIVE PIERCE-THROUGH APERTURE SEAL

[75] Inventor: Anthony R. Walser, Westland, Mich.

[73] Assignee: Ford Motor Company, Dearborn, Mich.

[21] Appl. No.: 333,694

[22] Filed: Nov. 3, 1994

[51] Int. Cl.⁶ .................................................. F16J 15/00
[52] U.S. Cl. ..................... 277/189; 277/26; 277/DIG. 10
[58] Field of Search ............................ 277/DIG. 10, 166, 277/181, 186, 188 R, 189, 26, 227, 235 R, 207 R

[56] References Cited

U.S. PATENT DOCUMENTS

| | | |
|---|---|---|
| 2,439,306 | 4/1948 | Laidley .................................... 277/189 |
| 3,062,557 | 11/1962 | Underwood ............................ 277/166 |
| 3,202,033 | 8/1965 | Weidner, Jr. ........................... 277/166 |
| 3,701,560 | 12/1970 | Emmerson . |
| 3,975,611 | 8/1976 | Gordon . |
| 4,152,753 | 5/1979 | Amann . |
| 4,746,023 | 5/1988 | Belter .............................. 277/DIG. 10 |
| 4,754,854 | 7/1988 | Adachi et al. . |
| 4,813,690 | 3/1989 | Coburn, Jr. . |
| 4,915,558 | 5/1990 | Muller . |
| 5,000,990 | 3/1991 | Freeman . |
| 5,172,467 | 12/1992 | Muller . |
| 5,205,075 | 4/1993 | Moyer . |
| 5,259,629 | 11/1993 | Udagawa .............................. 277/189 |

FOREIGN PATENT DOCUMENTS

| | | |
|---|---|---|
| 0168094 | 10/1921 | United Kingdom ................ 277/166 |
| 0371798 | 10/1930 | United Kingdom . |

Primary Examiner—Daniel G. DePumpo
Attorney, Agent, or Firm—David B. Kelley; Roger L. May

[57] ABSTRACT

A seal for sealing a bore defined by apertures in a pair of automotive components a membrane placed between the components and aligned parallel with a plane perpendicular to an axis through the bore. The membrane has a pierce-through weakened section positioned perpendicular to the axis with a plurality of non-perforating slices which intersect at a point on the membrane to provide a predetermined break force for allowing attachment means to pass therethrough in a predictable manner. A compressible bead attached around the perimeter of the membrane holds the membrane in tension.

5 Claims, 3 Drawing Sheets

5,524,907

AUTOMOTIVE PIERCE-THROUGH APERTURE SEAL

FIELD OF THE INVENTION

The present invention relates to seals for apertures, and, more particularly, to pierceable seals for vehicle component attachment apertures which penetrate the vehicle body.

BACKGROUND OF THE INVENTION

Automotive vehicles typically have a body structure surrounding various compartments, including the engine compartment, the passenger compartment, and a trunk or bed area. Attached to the body within these compartments are assorted vehicle components, most notably seats. A common means for attaching the seats to the body in many vehicles is a bolt which runs through apertures penetrating the seat pedestal, the floor pan, a reinforcement, and into a weld nut on the exterior of the reinforcement or floor pan. The apertures are made large enough so that the clearance between the bolt and the aperture allows easy insertion of the bolt during assembly. In addition, some vehicles have multiple apertures in the floor pan, all of which are not used, to accommodate several seat configurations for a given model vehicle.

Unless properly sealed, such penetrations in the floor pan and underbody reinforcement provide a potential path for dirt, dust and moisture to enter the passenger compartment. Butyl has been used for obstructing the bolt apertures by dapping a portion thereover and shooting the bolt therethrough, for example with a torque wrench. However, inconsistent application of butyl to the aperture may interfere with the amount of torque delivered from the wrench, potentially resulting in varying connection of the seat pedestal to the floor pan. Additionally, butyl does not reseal upon removal of the bolt, such as when the seats are configured differently after initial installation.

Other body aperture sealing means include a membraneless foam gasket place around the aperture, but such a device may be easily displaced during seat installation resulting in additional assembly time and expense.

SUMMARY OF THE INVENTION

Responsive to the aforementioned deficiencies in the related art, a body aperture seal is provided which is insertable between an automotive floor pan and a vehicle component attached thereto, the floor pan and the component each having an aperture therethrough aligned so as to form an attachment component receiving bore. The seal has a membrane aligned parallel with a plane perpendicular to an axis through the bore. On the membrane are a plurality of slices defining a weakened section for initiating breakage of the membrane therealong to form resilient wedges. Preferably, the slices are non-perforating in the sense that initially they do not penetrate the membrane. The membrane thus has a sealing position wherein the wedges are parallel with a plane perpendicular to an axis through the bore so as to obstruct the bore.

When an attachment component impinges upon the weakened section with a predetermined force, the membrane breaks along the slices to form resilient wedges which yield to allow the attachment member to pass through the seal. In this open position, the wedges are pushed out of the plane of the membrane.

A compressible bead attached around the perimeter of the membrane holds the membrane in tension. The bead is preferably made of a heat reactive sealer which foams to form a compression seal between the floor pan and the component when exposed to high temperatures.

Accordingly, an advantage of the present invention is a seal which reseals a vehicle body aperture upon removal of attachment means therefrom.

Another advantage of the present invention is an aperture seal which provides a consistent breakage tension for attachment means passing through an aperture.

According to one feature of the present invention, a vehicle body penetration seal has a pierce-through section with a predetermined break force for allowing attachment means to pass therethrough in a predictable manner.

According to another feature of the present invention, the pierce-through section has star-shaped center cuts molded into the compliant membrane for initiating breakage of the membrane along predetermined lines.

According to yet another feature of the present invention, a vehicle body penetration seal has a membrane made of a compliant material which yields to an attachment member passing therethrough yet reseals the penetration upon removal of the attachment member.

DETAILED DESCRIPTION OF THE PREFERRED EMBODIMENT

Figure 1:
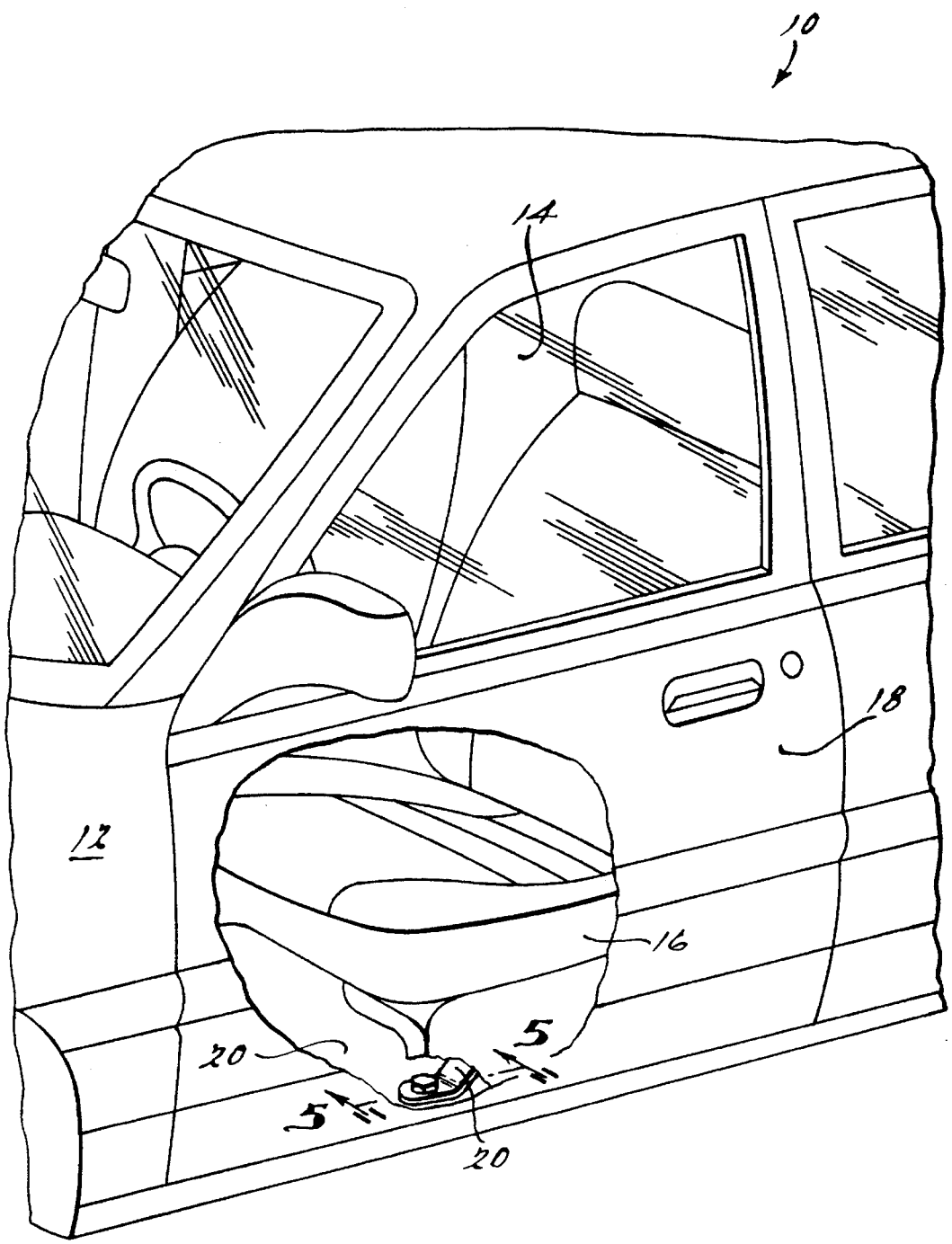
FIG. 1 is an exterior view of part of an automotive vehicle passenger compartment with a section cut-away showing attachment of a seat pedestal to the vehicle body.

Referring now to the drawings, and first to FIG. 1, a partial exterior view of an automotive vehicle 10 is shown having a body 12 surrounding a passenger compartment 14. The body 12 provides protection for passenger compartment 14 from the elements, such as wind, dirt, dust, and moisture, as well as support for interior and exterior components. Such interior components may include, for example, seat 16, as seen through a partially cutaway section of door 18. Seat 16 is removably secured to a floor pan 20 of body 12.

Figure 2:
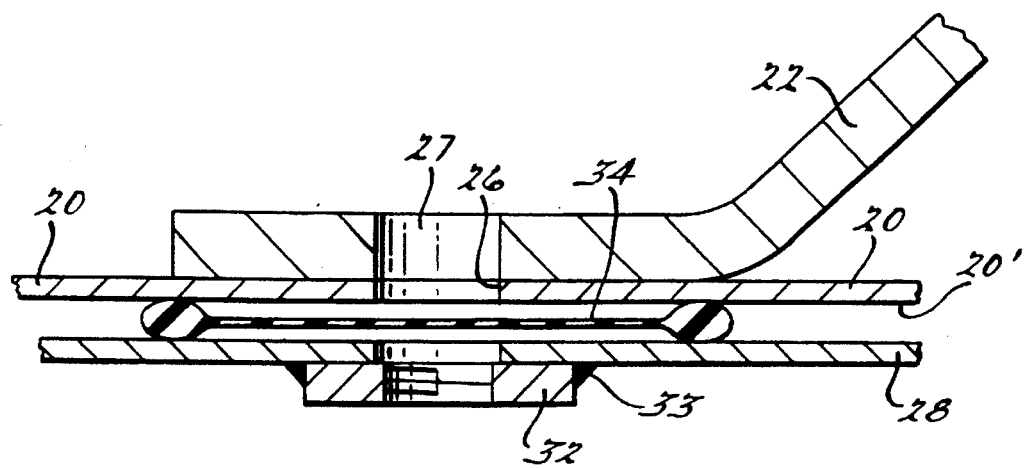
FIG. 2 is sectional view taken along line 5—5 of FIG. 1 shown with the seal in a sealing position and without an attachment member passing through the bore.
Figure 5:
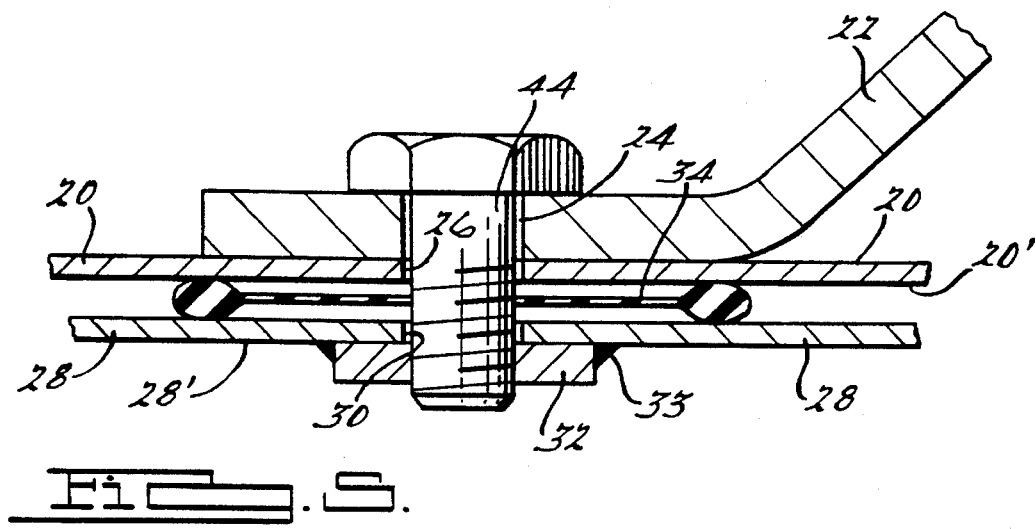
FIG. 5 is sectional view taken along line 5—5 of FIG. 1.

Attachment of seat 16 to floor pan 20 is accomplished as shown in FIGS. 2 and 5. A seat pedestal 22 extending from seat 16 is placed adjacent floor pan 20. Pedestal 22 has a bolt hole 24 therethrough which is aligned with aperture 26 through pan 20. An underbody reinforcement member 28 may also be attached on the underside 20' of floor pan 20 to provide additional support. Reinforcement member 28 also has an aperture 30 which is aligned with bolt hole 24 and aperture 26, thus defining bore 27. A nut 32 is welded with weld 33 to the lower side 28' of reinforcement member 28 in alignment with bolt hole 24 and apertures 26 and 30. A seal 34 is preferably placed between floor pan 20 and reinforcement member 28 to prevent contamination, dust, dirt, moisture, and the like, from passing through aperture 26 and bolt hole 24 to passenger compartment 14 (FIG. 2). Those skilled in the body sealing arts will appreciate that seal 34 can also be placed between seat pedestal 22 and floor pan 20, for example when a reinforcement member 28 is not utilized. In such a case (not shown), nut 32 is welded to the underside 20' of floor pan 20.

Figure 3:
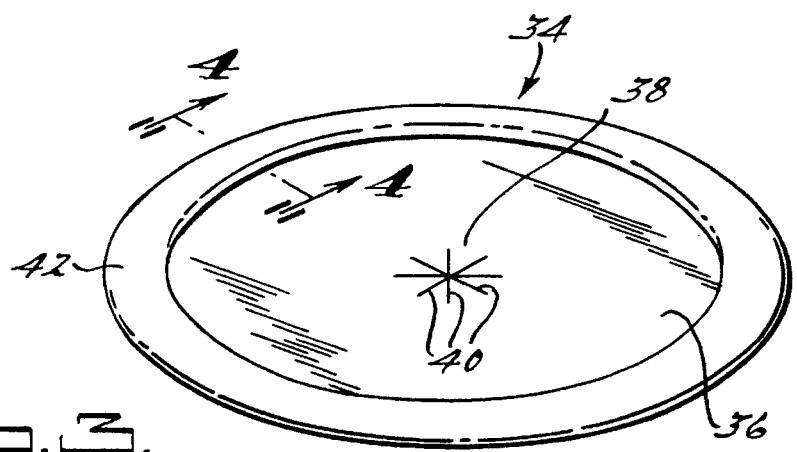
FIG. 3 is a perspective view of a pierce-through seal according to a preferred embodiment of the present invention.

Referring now to FIG. 3, seal 34 is comprised of membrane 36, preferably made of a thin, resilient material such as polypropylene, but which can also be made of nylon or metal foil. The thickness of membrane 36 will vary according to application, body construction, and type of attachment member, as those skilled in the art will understand. A thickness between approximately 0.5 mm and 2 mm is usually acceptable with a thickness of approximately 1 mm preferred when membrane 36 is made of polypropylene.

A center section 38 on membrane 36 has four intercepting slices 40, or "kiss cuts" of lesser thickness than membrane 36 (FIG. 3). Slices 40 weaken center section 38 with respect to the non-sliced area of membrane 36 so that when an attachment member impinges thereupon, as more fully described below. Membrane 36, and specifically center section 38, breaks along the slices 40 allowing the attachment member to pass through. The slices are preferably approximately one-fourth (¼) as thick as the non-sliced area of membrane 36, but again, as will be realized by those skilled in the art, slices 40 thickness may vary to permit a desired predetermined membrane 36 break force for allowing an attachment member to pass therethrough in a predictable manner. In a preferred embodiment, slices 40 are molded into a star-shaped (FIG. 3) by injection molding or other molding processes known to those skilled in the art and suggested by this disclosure. Slices 40 can also be cut into membrane 36.

Figure 6:
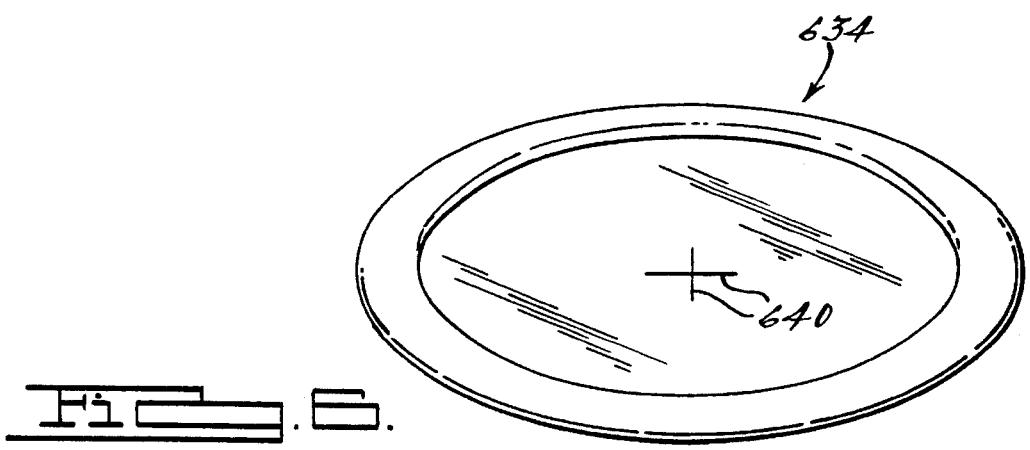
FIG. 6 is a perspective view of a pierce-through seal according to an alternative embodiment of the present invention.
Figure 7:
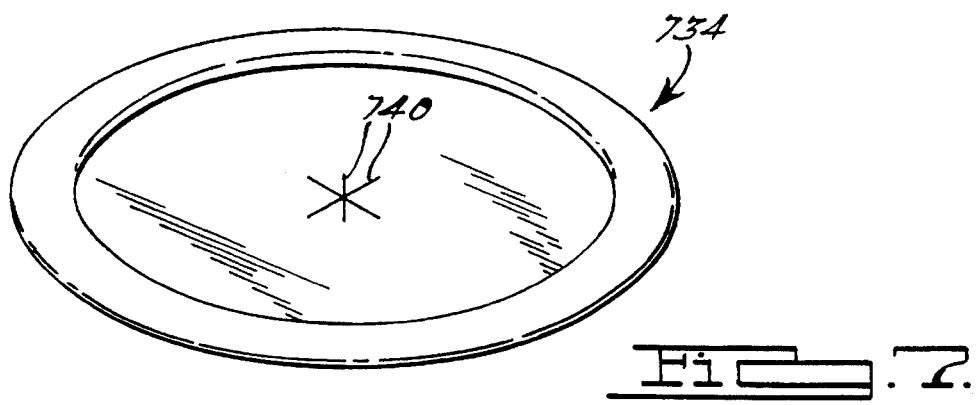
FIG. 7 is a perspective view of a pierce-through seal according to a second alternative embodiment of the present invention.

Other center section 38 configurations are also acceptable, including two intersecting slices 640 (FIG. 6) or three intersecting slices 740 (FIG. 7). A star-shape with five slices which meet a point in the center is also possible. That configuration would have slices which are separated by equal angles. Such configurations and others suggested by this disclosure initiate breakage of the membrane 36 along predetermined lines when impacted by an attachment member.

Figure 4:
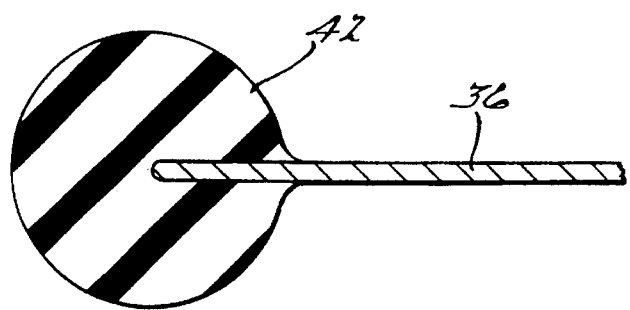
FIG. 4 is a sectional view taken along line 4—4 of FIG. 3.

Seal 34 is preferably generally circular since such a shape lends itself well to maintenance of a nearly constant tension across membrane 36 (FIG. 3). However, other shapes are acceptable and will not significantly decrease the advantageous characteristics of center section 38, as described above. A circular shaped bead 42 on the circumference of membrane 36 forms a ring for holding membrane 36 in tension and for providing a compression seal between floor pan 20 and reinforcement member 28. As previously mentioned, seal 34 may be positioned between different automotive components for pierceable yet resealable aperture sealing attachment bores. Bead 42 is preferably injection molded onto membrane 36 (FIG. 4) and preferably is made of a heat reactive sealer which foams to form a compression seal between the automotive body components adjacent thereto. Such a sealer will foam, for example, when vehicle 10 is exposed to high temperatures, usually in excess of 300° F. That temperature is reached or exceeded during the exterior paint-baking process.

Turning now to FIG. 5, an attachment member, such as bolt 44, is shown passing through the bore 27 and attaching to nut 32 in a conventional fashion. Upon attachment, bolt 44 impinges center section 38 with a predetermined force so as to cause membrane 36 to break along the lines of slices 40. In doing so, the breakage along slices 40 of center section 38 forms resilient web or flat members 46, which are pushed aside and toward reinforcement member 28. Flat members 46 are in the open position and remain so until bolt 44 is removed from the bore 27. When bolt 44 is removed from bore 27, flat members 46 resiliently move to the sealing position as shown in FIG. 2, thus preventing undesirable elements from passing through bore 27 to passenger compartment 14.

Membrane 36 is placed between floor pan 20 and reinforcement member 28 and is aligned parallel with a plane perpendicular to an axis through the bore 27.

Although the preferred embodiment of the present invention has been disclosed, various changes and modifications may be made without departing from the scope of the invention as set forth in the appended claims.

What is claimed is:

1. A seal insertable between an automotive floor pan and a vehicle component attached thereto, the floor pan and the component each having an aperture therethrough aligned so as to form an attachment receiving bore, the seal comprising:

(1) a membrane placed between the floor pan and the component, and aligned parallel with a plane perpendicular to an axis through the bore, the membrane having:

(a) a plurality of slices, in a section of the membrane perpendicular to the axis, for initiating breakage of the membrane therealong to form resilient wedges in the membrane;

(b) a sealing position wherein the wedges are parallel with a plane perpendicular to an axis through the bore so as to obstruct the bore; and (c) an open position wherein the wedges yield to an attachment member impinging thereupon with a predetermined force; and (2) a compressible bead attached around the perimeter of the membrane for holding the membrane in tension, the bead made of a heat reactive sealer which foams to form a compression seal between the floor pan and the component when exposed to high temperatures.

2. A seal according to claim 1 wherein the plurality of slices comprises four slices which intersect at a point in the membrane to form eight resilient wedges.

3. A seal according to claim 1 wherein the plurality of slices comprises two slices which intersect at a point in the membrane to form four resilient wedges.

4. A seal according to claim 2 wherein the membrane is made of a polypropylene material.

5. A seal according to claim 4 wherein the membrane is circular shaped and the bead forms a ring on the circumference of the membrane.

* * * * *